US012755600B2

(12) United States Patent
Kim

(10) Patent No.: US 12,755,600 B2
(45) Date of Patent: Oct. 6, 2026

(54) GAME MACHINE TOPPER DEVICE CAPABLE OF NONCONTACT POWER SUPPLY, CONTROL METHOD THEREOF, AND GAME MACHINE USING SAME

(71) Applicant: TOVIS CO., LTD., Incheon (KR)

(72) Inventor: Joon Seog Kim, Seongnam-si (KR)

(73) Assignee: TOVIS CO., LTD., Incheon (KR)

( * ) Notice: Subject to any disclaimer, the term of this patent is extended or adjusted under 35 U.S.C. 154(b) by 226 days.

(21) Appl. No.: 18/685,071

(22) PCT Filed: Aug. 16, 2022

(86) PCT No.: PCT/KR2022/012155
§ 371 (c)(1),
(2) Date: Feb. 20, 2024

(87) PCT Pub. No.: WO2023/022455
PCT Pub. Date: Feb. 23, 2023

(65) Prior Publication Data

US 2025/0054349 A1 Feb. 13, 2025

(30) Foreign Application Priority Data

Aug. 20, 2021 (KR) ........................ 10-2021-0109804

(51) Int. Cl.
*G07F 17/32* (2006.01)

(52) U.S. Cl.
CPC ...... *G07F 17/3211* (2013.01); *G07F 17/3216* (2013.01); *G07F 17/3223* (2013.01)

(58) Field of Classification Search
CPC ............. G07F 17/3211; G07F 17/3216; G07F 17/3223
USPC ............................................................ 463/31
See application file for complete search history.

(56) References Cited

U.S. PATENT DOCUMENTS 9,853,480 B2 12/2017 Matos et al.
10,510,205 B2 12/2019 Merkel et al.
10,621,821 B2 * 4/2020 Arnone ............... G07F 17/3211
11,043,064 B2 6/2021 Merkel et al.
(Continued)

FOREIGN PATENT DOCUMENTS

BR 112013032961 A2 1/2017
CN 103718426 A 4/2014
(Continued)

*Primary Examiner* — Allen Chan
(74) *Attorney, Agent, or Firm* — NSIP Law

(57) ABSTRACT

A topper device for a gaming machine according to an aspect of the present invention is coupled to an upper portion of a gaming machine body, operates in conjunction with the gaming machine, and includes: a display module; a housing on which a display module is fixed and which includes a first coupling structure capable of being coupled with the upper portion of the gaming machine body; and a wireless power receiving module which supplies necessary power to the display module based on power provided from the gaming machine, wherein the wireless power receiving module is provided power from the gaming machine body using a wireless power receiving coil unit equipped with the first coupling structure and the wireless power receiving coil unit can be magnetically coupled to a wireless power transmission coil unit provided in the upper portion of the gaming machine body.

10 Claims, 9 Drawing Sheets

(56) References Cited

U.S. PATENT DOCUMENTS

| | | | | |
|---|---|---|---|---|
| 11,205,317 | B2 | 12/2021 | Kuhlmann et al. | |
| 11,361,614 | B2 * | 6/2022 | Seckel | G07F 17/3267 |
| 2005/0124417 | A1 * | 6/2005 | Sosnoski | G07F 17/3202 463/46 |
| 2009/0029761 | A1 * | 1/2009 | Nagano | G07F 17/32 463/20 |
| 2009/0221363 | A1 * | 9/2009 | Brunet de Courssou | G07F 17/3202 463/25 |
| 2010/0130278 | A1 * | 5/2010 | Shimabukuro | G07F 17/32 463/16 |
| 2015/0002086 | A1 | 1/2015 | Matos et al. | |
| 2016/0104343 | A1 * | 4/2016 | Pellegrini | G07F 17/3244 463/31 |
| 2018/0286174 | A1 | 10/2018 | Merkel et al. | |
| 2018/0286175 | A1 | 10/2018 | Kuhlmann et al. | |
| 2020/0074792 | A1 | 3/2020 | Merkel et al. | |
| 2022/0114859 | A1 | 4/2022 | Merkel et al. | |

FOREIGN PATENT DOCUMENTS

| | | | |
|---|---|---|---|
| EP | 2724447 | A1 | 4/2014 |
| JP | 2007-282686 | A | 11/2007 |
| JP | 2009-045327 | A | 3/2009 |
| JP | 4778350 | B2 | 9/2011 |
| JP | 2014-517679 | A | 7/2014 |
| JP | 6059215 | B2 | 1/2017 |
| JP | 2018-175855 | A | 11/2018 |
| JP | 2019-10499 | A | 1/2019 |
| JP | 6843791 | B2 | 3/2021 |
| JP | 6843796 | B2 | 3/2021 |
| KR | 10-2010-0027647 | A | 3/2010 |
| KR | 10-2014-0022924 | A | 2/2014 |
| KR | 10-2015-0072460 | A | 6/2015 |
| KR | 10-2018-0029810 | A | 3/2018 |
| KR | 10-2018-0137416 | A | 12/2018 |
| KR | 10-1890201 | B1 | 1/2019 |
| SG | 194994 | A1 | 12/2013 |
| WO | WO 2012/177283 | A1 | 12/2012 |

* cited by examiner

[Fig. 1]
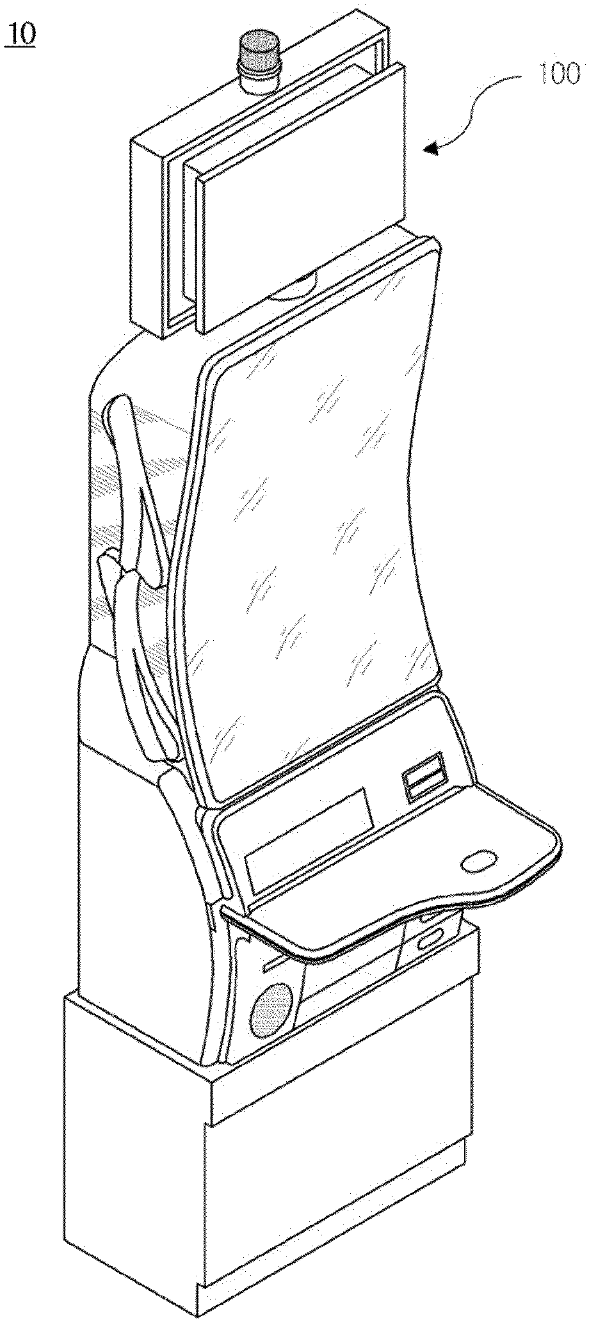

[Fig. 2]
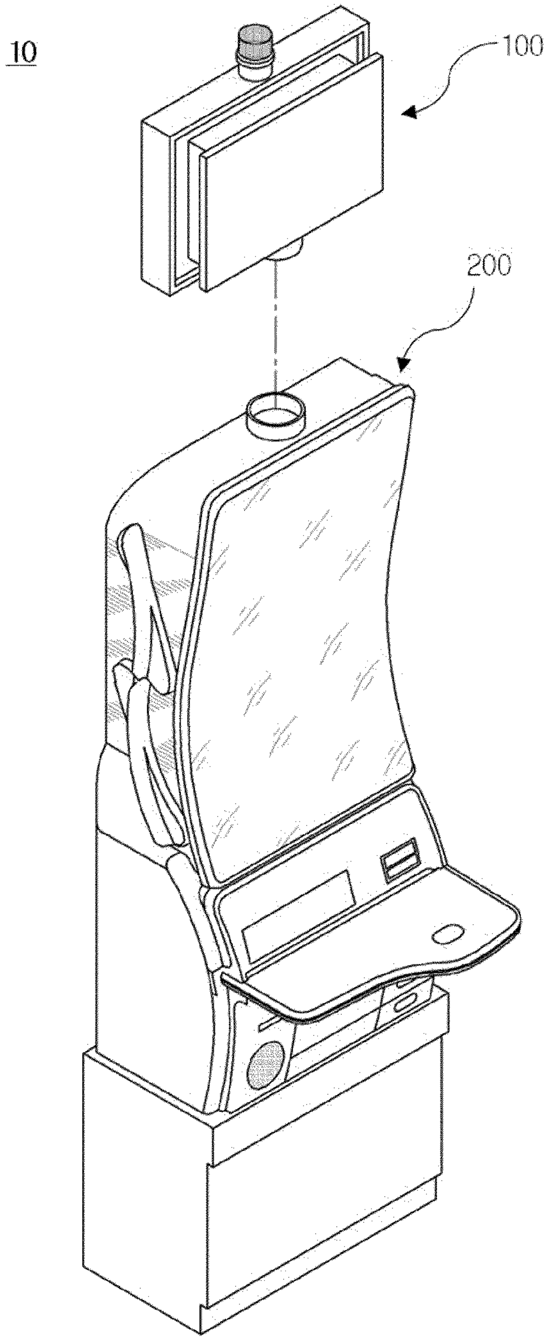

[Fig. 3]
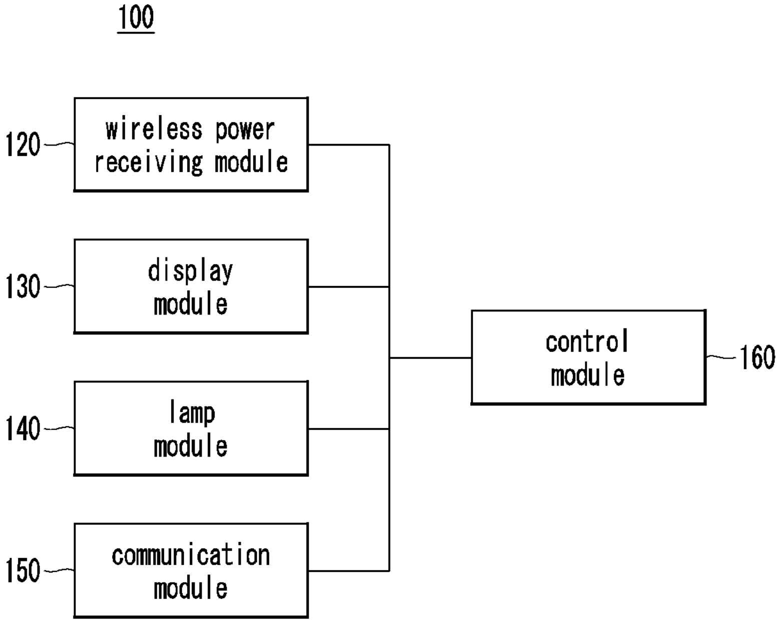

[Fig. 4]
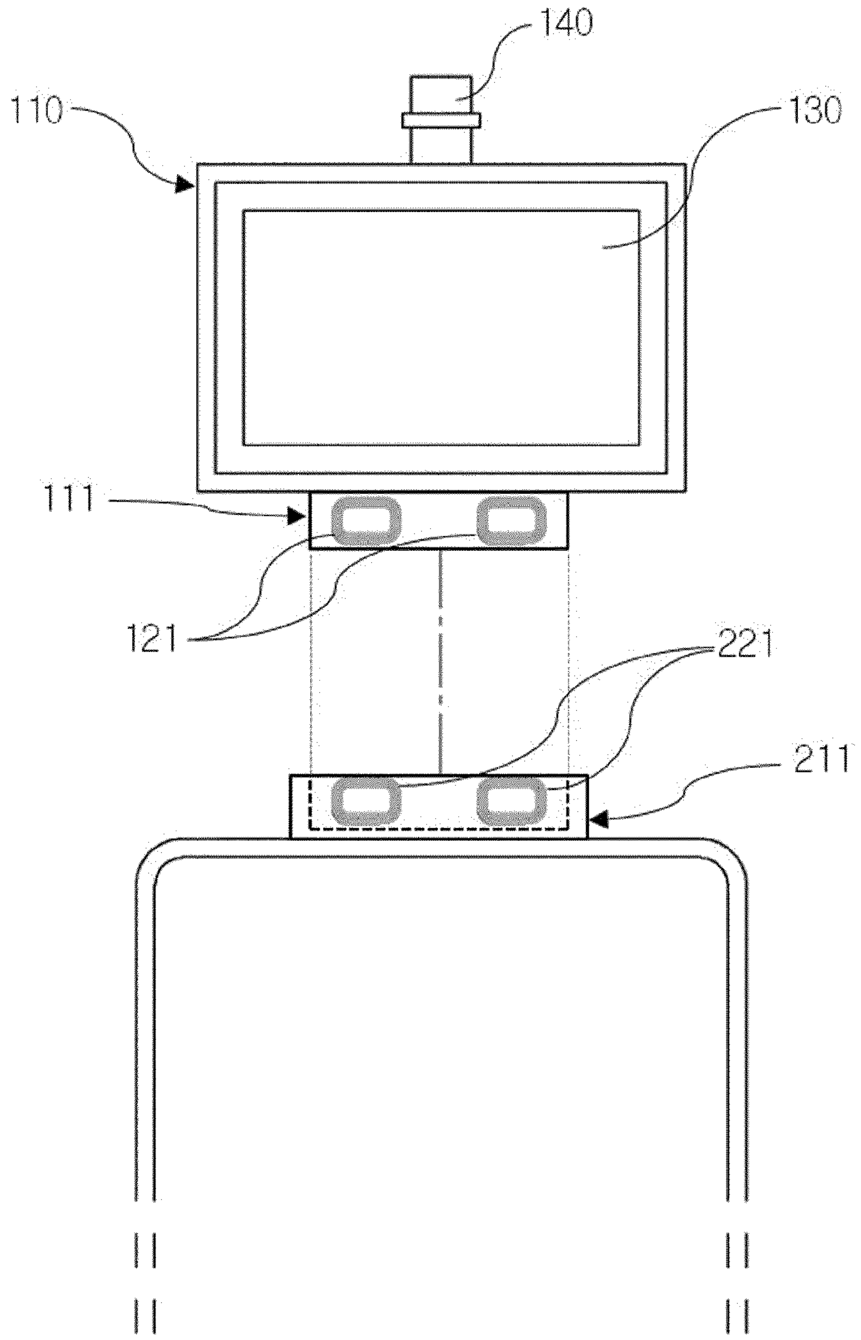

[Fig. 5]
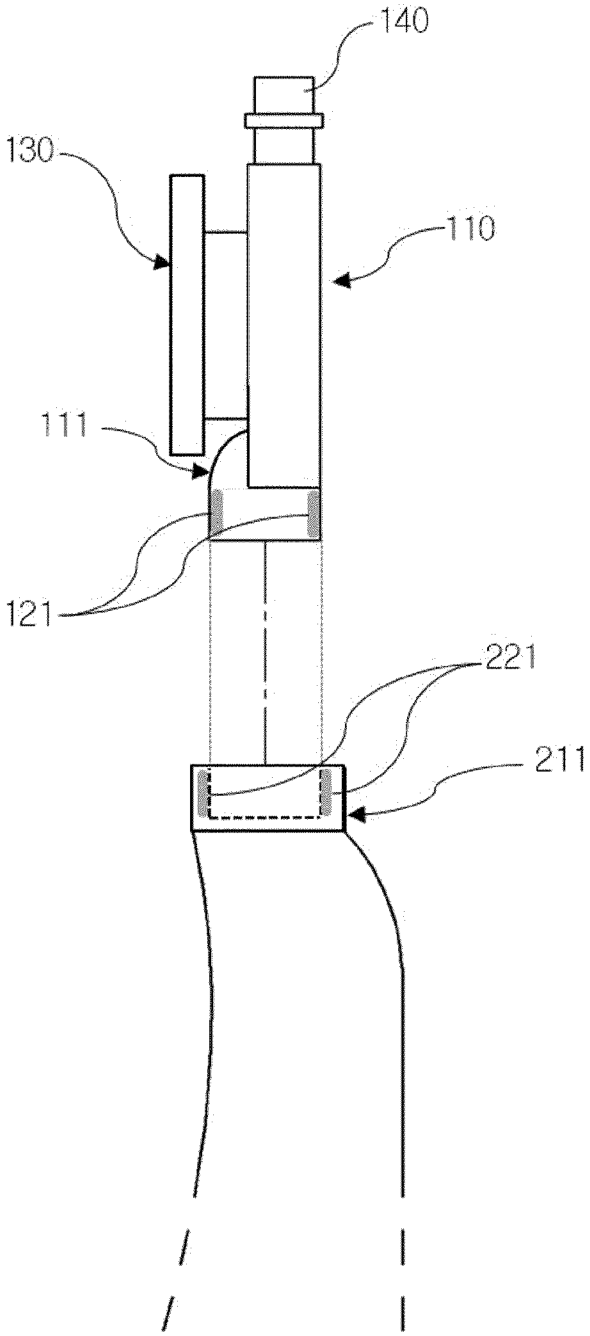

[Fig. 6]
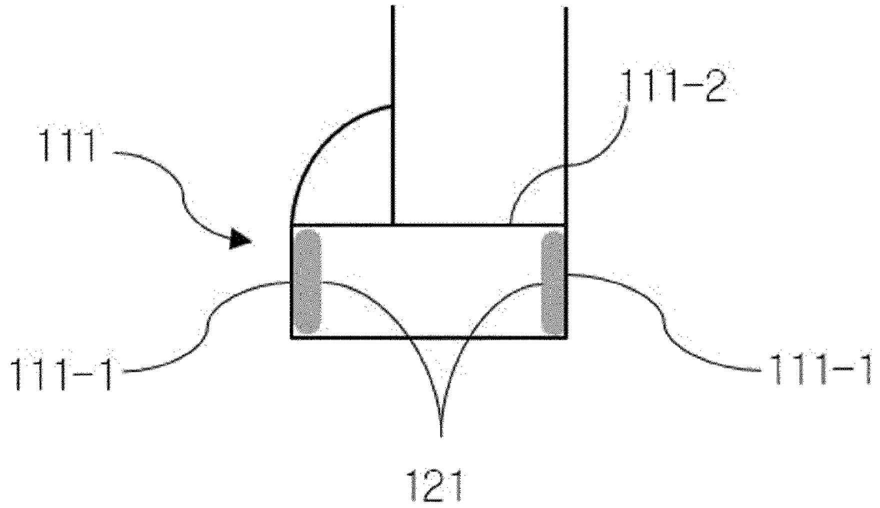
[Fig. 7]
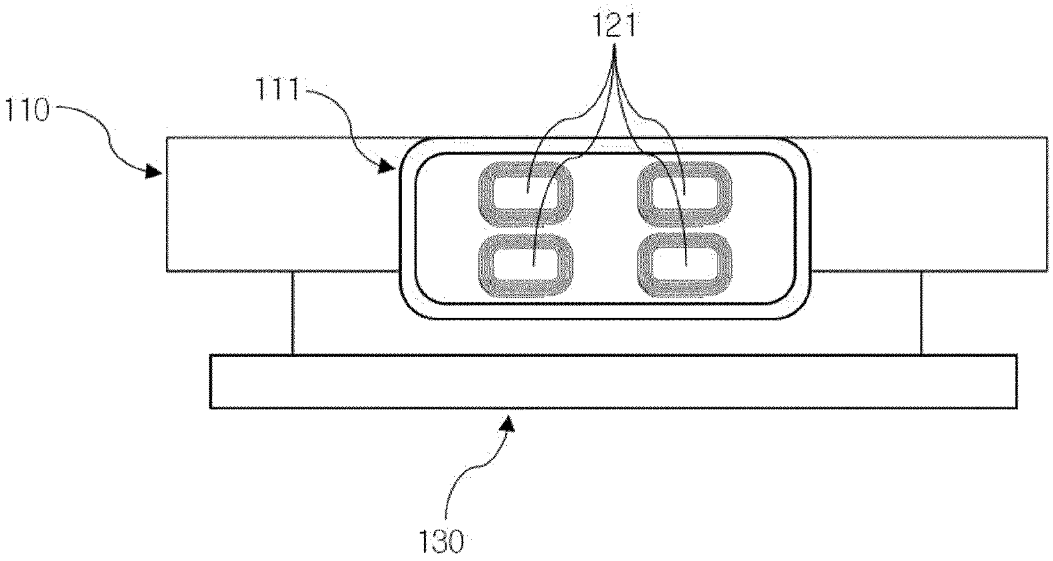

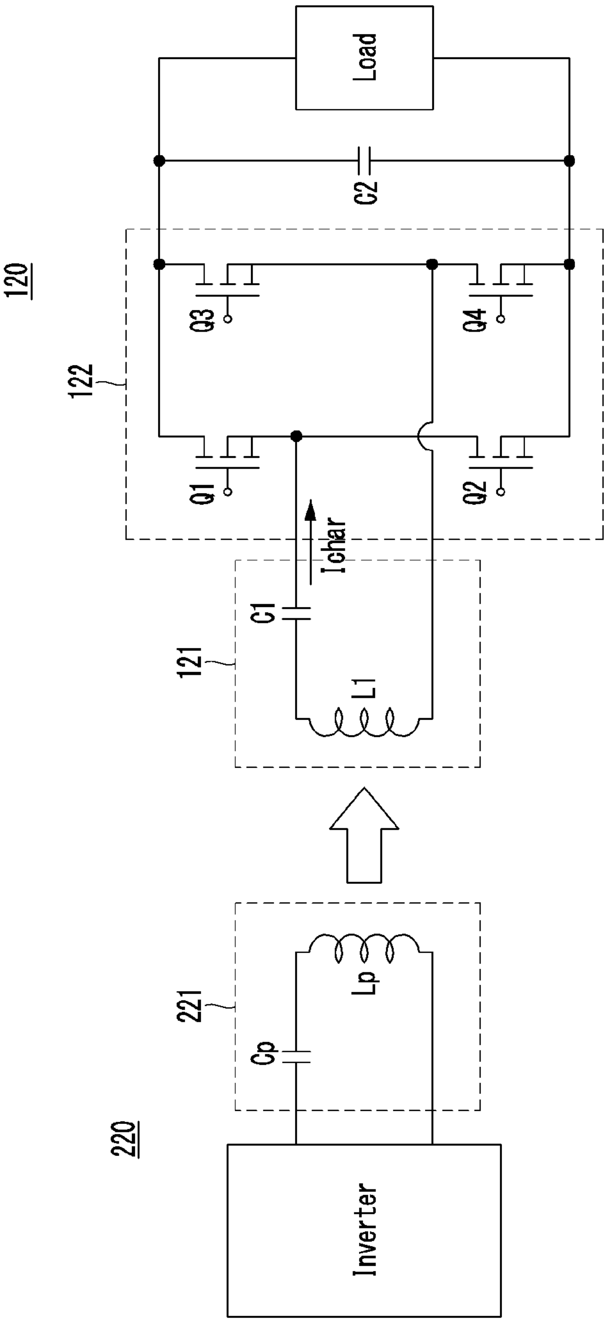
[Fig. 8]

[Fig. 9]
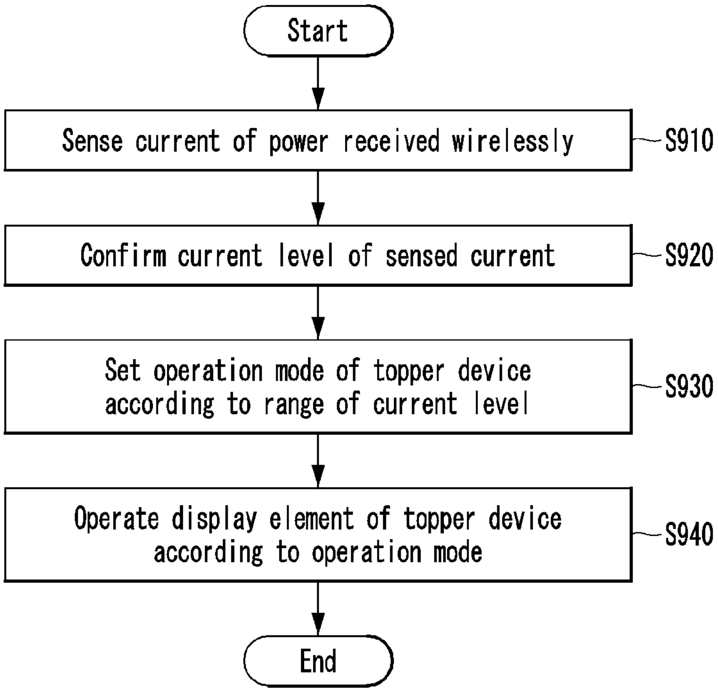

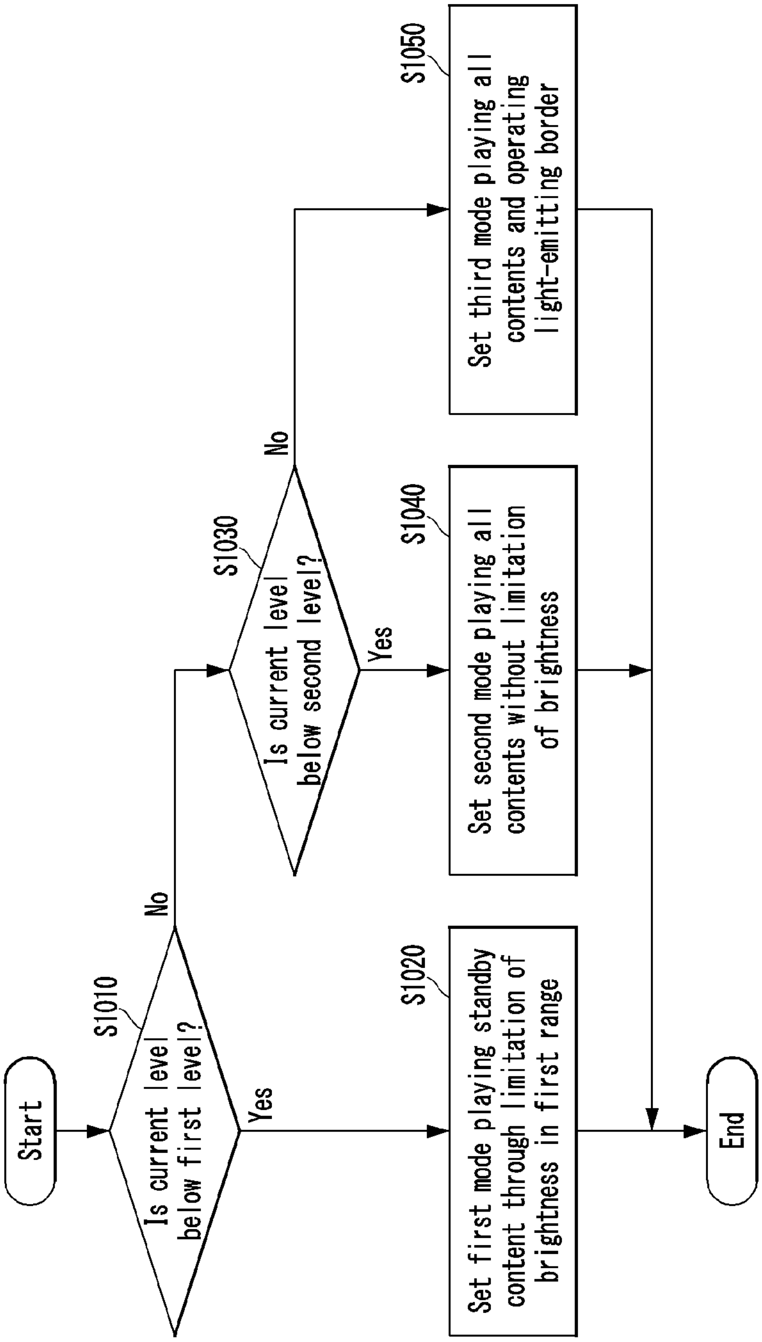
[Fig. 10]

GAME MACHINE TOPPER DEVICE CAPABLE OF NONCONTACT POWER SUPPLY, CONTROL METHOD THEREOF, AND GAME MACHINE USING SAME

CROSS REFERENCE TO RELATED APPLICATIONS

This application is a U.S. National Stage Application of International Application No. PCT/KR2022/012155, filed on Aug. 16, 2022, which claims the benefit under 35 USC 119 (a) and 365(b) of Korean Patent Application No. 10-2021-0109804, filed on Aug. 20, 2021, in the Korean Intellectual Property Office, the entire disclosure of which is incorporated herein by reference for all purposes.

TECHNICAL FIELD

The present disclosure relates to a topper device for a gaming machine capable of non-contact power supply, a control method thereof, and a gaming machine using the same.

BACKGROUND ART

A gaming machine, such as a slot machine, operates game software to provide a user with entertainment and amusement. Recently, various technologies have been applied to gaming machines to provide enhancement of the gaming machines and convenience of interfaces.

In particular, in the field of gaming machines like slot machines, to provide users with splendid and various information and to visually indicate situations such as jackpots, a display is equipped at the top of the gaming machine, which is called a topper.

Meanwhile, since a topper device is fixed on the top of a gaming machine body, the gaming machine has a disadvantage in that it is inconvenient to move due to an increase in overall height of the gaming machine.

Additionally, because the topper device is protrudingly fixed on the top of the gaming machine body, it is common for the topper device to be damaged during movement, and in such a case, it is inconvenient to detach and replace the topper device.

CITATION

Patent Literature (Patent Document 1) U.S. Pat. No. 11,043,064

DISCLOSURE

Technical Problem

One technical aspect of the present invention is to solve the problems of the conventional technology mentioned above. According to an embodiment of the present invention, it is an objective to provide a topper device for a gaming machine, which is capable of being easily coupled and separated by forming a wireless power transmission interface between the topper device and the gaming machine using a wireless power module to receive power from the gaming machine, a control method thereof, and a gaming machine using the same.

It is another objective to provide a topper device for a gaming machine, which provides a wireless power coil to a portion where the topper device and the gaming machine are coupled so as to form a wireless power transmission interface without any wiring work once the topper device is coupled to the gaming machine, a control method thereof, and a gaming machine using the same.

It is a further objective to provide a topper device for a gaming machine, which differentially controls control functions according to the amount of power input through the wireless power module to operate the topper device suitable for power supply situations, a control method thereof, and a gaming machine using the same.

The objectives of the present invention are not limited to those mentioned above, and other objectives not mentioned herein will be clearly understood by those skilled in the art from the following description.

Technical Solution

To accomplish the above-mentioned objects, according to the present invention, there is provided a topper device for a gaming machine, which is coupled to an upper portion of a gaming machine body and operates in conjunction with the gaming machine, including: a display module; a housing on which a display module is fixed and which includes a first coupling structure capable of being coupled with the upper portion of the gaming machine body; and a wireless power receiving module which supplies necessary power to the display module based on power provided from the gaming machine, wherein the wireless power receiving module is provided power from the gaming machine body using a wireless power receiving coil unit equipped with the first coupling structure and the wireless power receiving coil unit can be magnetically coupled to a wireless power transmission coil unit provided in the upper portion of the gaming machine body.

In an embodiment, the wireless power receiving module includes a communication module which receives content data to be displayed through the topper device from the gaming machine body using a short-range wireless communication method with the gaming machine body.

In an embodiment, the upper portion of the gaming machine body includes a second coupling structure, the first coupling structure is fastened and fixed to the second coupling structure, and the first coupling structure and the second coupling structure each include at least two sides that touch and support each other.

In an embodiment, the wireless power receiving coil unit includes a plurality of wireless power receiving coils formed on each of the at least two sides included in the first coupling structure.

In an embodiment, the at least two sides included in the first coupling structure are made of a non-metallic material.

In an embodiment, the first coupling structure further includes a magnetic shielding layer which is provided on upper portions of the at least two sides and on which a magnetic shielding sheet is attached.

In an embodiment, the topper device for a gaming machine further includes a control module which sets different operation modes of the topper device corresponding to the current level of power received wirelessly from the wireless power receiving module, and controls to restrictively operate at least a portion of display elements of the topper device according to the operation modes.

In an embodiment, the control module confirms the current level of the receiving current received wirelessly through the wireless power receiving coil unit, and when the confirmed current level is below a preset first current level, sets the operation mode to a first mode. In the first mode, the control module limits the brightness of the display module within a first range, and restricts the content displayed on the display module to standby content.

In an embodiment, when the confirmed current level is equal to or above the first current level but below a second current level, which is set higher than the first current level, the control module sets the operation mode to a second mode. In the second mode, the control module does not limit the brightness of the display module, and does not restrict the content displayed on the display module.

In another aspect of the present invention, there is provided a control method of a topper device for a gaming machine, which is coupled to an upper portion of a gaming machine body, operates in conjunction with the gaming machine body, and operates by receiving power wirelessly from the gaming machine body using a wireless power receiving coil unit, including the steps of: determining the current level of the receiving current received wirelessly through the wireless power receiving coil unit; setting different operation modes of the topper device corresponding to the range of the confirmed current level; and controlling to restrictively operate at least a portion of display elements of the topper device according to the set operation mode.

In an embodiment, the step of setting different operation modes of the topper device includes the steps of: setting the operation mode to a first mode when the confirmed current level is below a preset first current level; and setting the operation mode to a second mode when the confirmed current level exceeds the first current level but is below a second current level, which is higher than the first current level.

In an embodiment, the step of setting different operation modes of the topper device further includes a step of setting the operation mode to a third mode when the confirmed current level exceeds the second current level.

In an embodiment, in the first mode, the brightness of the display module of the topper device is limited within a first range, and the content displayed on the display module is restricted to standby content.

In an embodiment, in the second mode, the brightness of the display module of the topper device is not limited, and the content displayed on the display module is not restricted.

In an embodiment, in the third mode, the brightness of the display module of the topper device is not limited, the content displayed on the display module is not restricted, and a light-emitting border provided at the edge of the display module of the topper device performs a lighting operation.

In another aspect of the present invention, there is provided a gaming machine including: a gaming machine body which displays game images through a body display and controls operations of a game according to a user's input to provide the game to the user; and a topper device for a gaming machine, which is coupled to an upper portion of the gaming machine body and operates by displaying content data provided from the gaming machine body, wherein the topper device for a gaming machine receives power wirelessly from the gaming machine body in a non-contact manner using a wireless power receiving coil unit which magnetically couples with a wireless power transmission coil unit included in the gaming machine body.

In an embodiment, the topper device includes: a display module; a housing on which a display module is fixed and which includes a first coupling structure capable of being coupled with the upper portion of the gaming machine body; and a wireless power receiving module which receives power from the gaming machine body in the non-contact manner using the wireless power receiving coil unit included in the first coupling structure, and supplies necessary power to the display module.

In an embodiment, the upper portion of the gaming machine body includes a second coupling structure, wherein the first coupling structure is fastened and fixed to the second coupling structure, and the first coupling structure and the second coupling structure each include at least two sides that touch and support each other.

In an embodiment, a plurality of wireless power receiving coils are provided on at least two sides included in the first coupling structure, a plurality of wireless power transmission coils are provided on at least two sides included in the second coupling structure, and the plurality of wireless s power receiving coils and the plurality of wireless power transmission coils are provided at positions corresponding to each other.

The topper device further includes a control module which sets different operation modes of the topper device corresponding to the current level of power received wirelessly from the wireless power receiving module, and controls to restrictively operate at least a portion of display elements of the topper device according to the operation modes.

The solutions to the above problems are not exhaustively enumerated by the features of the present invention. Various means for solving the problems of the present invention can be more fully understood by referring to specific embodiments in the detailed description below.

Advantageous Effect

According to the present invention, there is at least one or more of the following effects.

According to an embodiment of the present invention, by receiving power from the gaming machine using a wireless power module, the power transmission interface between the topper device and the gaming machine is formed wirelessly, thereby easily coupling and separating the topper device.

Moreover, according to an embodiment of the present invention, the wireless power coils is provided at the portion where the topper device and the gaming machine are coupled so as to form the wireless power transmission interface without any wiring work once the topper device is coupled to the gaming machine.

In addition, according to an embodiment of the present invention, the control functions are differentially controlled according to the amount of power input through the wireless power module, thereby operating the topper device suitable for power supply situations.

The effects of the present invention are not limited to the above-mentioned effects, and other effects, which are not specifically mentioned herein, will be clearly understood by those skilled in the art from the following description.

DESCRIPTION OF DRAWINGS

FIG. 1 is a perspective view illustrating an example of a gaming machine to which a topper device for a gaming machine according to an embodiment of the present invention is coupled.

FIG. 2 is a plan view illustrating a separated state of the topper device from the gaming machine illustrated in FIG. 1.

FIG. 3 is a block diagram of the topper device for the gaming machine according to an embodiment of the present invention.

FIG. 4 is a front view illustrating an example of the topper device for the gaming machine according to an embodiment of the present invention.

FIG. 5 is a side sectional view illustrating an example of the topper device for the gaming machine illustrated in FIG. 4.

FIG. 6 is a side sectional view illustrating a coupling structure of the topper device for the gaming machine according to an embodiment of the present invention.

FIG. 7 is a bottom view illustrating another example of a gaming machine topper device according to an embodiment of the present invention.

FIG. 8 is a circuit diagram illustrating an example of a wireless power receiving module illustrated in FIG. 3.

FIG. 9 is a flowchart depicting a control method performed in a control module illustrated in FIG. 3.

FIG. 10 is a flowchart depicting an example of step S930 illustrated in FIG. 9.

MODE FOR INVENTION

Hereinafter, preferred embodiments of the present invention will be described with reference to the accompanying drawings.

However, the embodiments according to the present disclosure may be modified in a variety of different forms, and it should be understood that interpretation of the scope of the present disclosure is not limited to the following embodiments. The embodiments of the present disclosure are provided to person having ordinary skill in the art for the best explanation.

The various embodiments and terms used in the present invention are not intended to limit the technical features described herein to specific embodiments but are to be understood as including various modifications, equivalents, or substitutes thereof. In the description of the drawings, similar or related components may be designated with similar reference numerals. The singular form of a noun corresponding to an item, unless clearly indicated otherwise in the context, can include one or more of items. In the present invention, phrases such as “A or B”, “at least one of A and B”, “at least one of A or B”, “A, B, or C”, “at least one of A, B, and C”, and “at least one of A, B, or C” each can include any one of the items listed in the phrases, or any combination of them. Terms like “$1^{st}$”, “$2^{nd}$”, “first”, or “second” may be used simply to distinguish one component from another and do not limit the components in any other aspect (e.g., importance or order). When one (e.g., first) component is mentioned as being “coupled”, “connected”, or “linked” to another (e.g., second) component, with or without the terms “functionally” or “communicatively”, it means that the one component can be directly connected to the other component, or connected through a third component.

In the present invention, the term “module” can include units implemented in hardware, software, or firmware, and can be interchangeably used with terms like logic, logic block, part, or circuit. A module may be a component integrated as a whole, or a minimum unit or a portion of the component performing one or more functions. For example, according to an embodiment, the module could be implemented in the form of an application-specific integrated circuit (ASIC).

Various flowcharts are disclosed for describing embodiments of the present invention, but the flowcharts are for the convenience of describing each step, and it is not necessary for the steps to be performed in the order shown in the flowcharts. That is, each step in the flowcharts can be performed simultaneously with other steps, in the order shown, or even in the reverse order of that shown in the flowcharts.

FIG. 1 is a perspective view illustrating an example of a gaming machine to which a topper device for a gaming machine according to an embodiment of the present invention is coupled, and FIG. 2 is a plan view illustrating a separated state of the topper device from the gaming machine illustrated in FIG. 1.

FIGS. 1 and 2 illustrate a gaming machine 10. The gaming machine 10 includes a body display, and can display game contents through the body display device to provide a game to a user.

The gaming machine 10 includes an input device to input user manipulation to receive user operations. Depending on embodiments, the gaming machine can provide various input and output interfaces to the user, such as offering touch functionality on the main body display.

A topper device 100 for the gaming machine can be used as one of the output interfaces of the gaming machine 10. The topper device 100 for the gaming machine can be coupled to an upper portion of a gaming machine body 200, and can display content data provided from the gaming machine body 200. Examples of the content data displayed by the topper device 100 for the gaming machine include content related to games performed on the gaming machine body 200, and content notifying events such as jackpots occurring on the gaming machine body 200.

The topper device 100 for the gaming machine includes a wireless power receiving coil unit. The wireless power receiving coil unit can magnetically couple with a wireless power transmission coil unit included in the gaming machine body 200 to receive power wirelessly from the gaming machine body in a non-contact manner.

That is, the topper device 100 for the gaming machine can receive power from the gaming machine body 200 in a non-contact wireless manner without a power line connection with the gaming machine body 200. As a result, as illustrated in FIG. 2, the topper device 100 for the gaming machine can be easily separated. Accordingly, when the entire gaming machine moves, the main body and the topper device 100 for the gaming machine can be transported individually, thereby preventing potential damage to the topper device 100 for the gaming machine during movement, and making repairs and maintenance of the topper device 100 for the gaming machine more convenient.

Meanwhile, since the topper device 100 for the gaming machine receives power wirelessly, the control of the topper device 100 for the gaming machine can be set differently depending on the size of the received power. Therefore, the topper device 100 for the gaming machine can be operated stably without a separate storage device like a battery in an environment where power is supplied wirelessly. The operation of the topper device 100 for the gaming machine will be described further with reference to FIG. 8.

FIG. 3 is a block diagram of the topper device for the gaming machine according to an embodiment of the present invention.

Referring to FIG. 3, the topper device 100 for the gaming machine can include a wireless power receiving module 120, a display module 130, and a control module 160. According to an embodiment, the topper device 100 for the gaming machine can further include at least one of a lamp module 140 and a communication module 150. Although not shown in FIG. 3, the topper device 100 for the gaming machine includes a housing on which the display module 130 is fixed and has a coupling structure capable of being coupled to the upper portion of the gaming machine body 200.

The wireless power receiving module 120 includes a wireless power receiving coil unit. The wireless power receiving coil unit can magnetically couple with a wireless power transmission coil unit provided at the upper portion of the gaming machine body to receive power wirelessly.

For example, the wireless power receiving module 120 can receive power wirelessly using a magnetic resonance method, but is not limited thereto, and can receive power through other methods such as magnetic inductive resonance.

The example shown in FIG. 3 is illustrative, and the topper device 100 for the gaming machine according to the present invention includes various modified embodiments. For instance, the topper device 100 for the gaming machine could further include a battery (not shown) for charging a portion of the power supplied from the wireless power receiving module.

FIG. 8 is a circuit diagram for depicting an embodiment of the wireless power receiving module shown in FIG. 3. Referring to FIG. 8, an embodiment of the wireless power receiving module 120 will be described.

Referring to FIG. 8, the gaming machine body 220 can include a wireless power transmitting module 220. The wireless power transmitting module 220 includes a wireless power transmission coil unit 221. The wireless power transmission coil unit 221 can include a transmission coil Lp and a resonant capacitor Cp.

Moreover, the wireless power receiving module 120 of the topper device 100 for the gaming machine can include a wireless power receiving coil unit 121 and a rectifying circuit 122. The wireless power receiving coil unit 121 can include a receiving coil L1 and a resonant capacitor C1.

As the wireless power receiving coil unit 121 magnetically couples with the operation of the wireless power transmission coil unit 221, a receiving current Ichar flows through the wireless power receiving coil unit 121. Since the receiving current is proportional to the received power, the size of the received power can be determined according to the level of the receiving current. The control module 160 can differentially control the operation of the topper device 100 for the gaming machine according to the level of the receiving current, thereby naturally operating the topper device 100 for the gaming machine even in case of a power supply issue. Meanwhile, in FIG. 8, the receiving current Ichar is depicted as current flowing in a resonant tank 121, but it is illustrative and is not limited thereto. Thus, various modifications are possible, for example, setting the output current of the rectifying circuit 122 as the receiving current.

In an embodiment, the receiving coil can be provided in plural. The receiving coil can be located in the coupling structure of the housing to be placed adjacent to the transmission coil, it may. It will be described in detail below with reference to FIGS. 4 to 6.

Referring back to FIG. 3, the display module 130 includes a display for the topper device, and operates based on the power provided by the wireless power receiving module 120.

In an embodiment, the display module 130 can include a display, and a light-emitting border provided around the edge of the display module. The light-emitting border is formed on the outer edge of the display module, and can include a light-emitting element and a medium element (for example, a diffuser, etc.) that propagates the light generated from the light-emitting element. The light-emitting border is provided to add visual effects, and the display and the light-emitting border operate according to the control of the control module 160.

The lamp module 140 is a lamp that is provided on the upper portion of the topper device 100 for the gaming machine and activates when events such as jackpots occur in the gaming machine body, and is operated according to the control of the control module 160. For instance, the lamp module 140 can include an internal light source capable of rotating or blinking, and can also include a speaker.

The communication module 150 forms a communication channel with the gaming machine body 200, and can transmit or receive data to or from the gaming machine body 200.

In an embodiment, the communication module 150 can receive content data to be displayed through the topper device for the gaming machine from the gaming machine body 200 using a short-range wireless communication method. For instance, the communication module 150 can receive content data from the gaming machine body 200 using short-range wireless communication methods, such as Bluetooth or near field communication (NFC).

In another embodiment, the communication module 150 can receive content data based on a wired connection. For example, the communication module 150 can support serial ports for serial communication methods such as RS-232, RS-422, RS-485, or USB communication ports. Wired connection uses standard communication ports, thereby allowing simpler connection than power connections, and supporting the application of wired communication methods in terms of popularization and cost reduction of wired communication ports.

The control module 160 can control the operation of the topper device 100 by controlling other components of the topper device 100. For this purpose, the control module 160 can include an arithmetic device (for example, a central processing unit) and a storage device (for example, a memory), and provide control functions based on instructions executed by the arithmetic device and the storage device.

For example, the control module 160 can control the display of the display module 130 using content data provided from the gaming machine body 200.

For instance, the control module 160 can receive event occurrence information from the gaming machine body and control to display event-specific content suitable for the event situation of the gaming machine body.

The control module 160 can set different operation modes of the topper device according to situations of the power received from the wireless power receiving module. For example, the control module 160 can set different operation modes of the topper device corresponding to the current level of the power received wirelessly, and can control to restrictively operate at least a portion of display elements of the topper device depending on the operation modes.

For instance, the control module 160 can set different contents according to the situations of the power received from the wireless power receiving module. For example, the control module 160 can do, or differentiate contents to be displayed in a low power situation and contents in a normal power situation, and set different contents to be displayed according to the situation of the power currently received from the wireless power receiving module.

For example, the control module 160 can set differential control standards, such as stopping operation, low-level operation, high-level operation, etc., with respect to at least a portion of the display elements of the topper device to operate the display elements of the topper device according to the situations of the power received from the wireless power receiving module.

The control operations of the control module 160 will be described in more detail below with reference to FIGS. 9 to 10.

FIG. 4 is a front view illustrating an example of the topper device for the gaming machine according to an embodiment of the present invention, and FIG. 5 is a side sectional view illustrating an example of the topper device for the gaming machine illustrated in FIG. 4. Hereinafter, an example of the topper device will be described with reference to FIGS. 4 and 5.

In FIGS. 4 and 5, the topper device 100 includes the housing 110, and the display module 130 and the lamp module 140 can be fixed on the housing 110. Although not shown, the wireless power receiving module 120, the communication module 150, and the control module 160 can be mounted in an inner space of the housing 110.

The housing 110 includes a first coupling structure 111 that can be coupled to the upper portion of the gaming machine body. The first coupling structure 111 can be fastened and fixed to a second coupling structure 211 provided on the upper portion of the gaming machine body.

For example, as illustrated, the first coupling structure 111 of the housing 110 can be inserted into the second coupling structure 211 on the upper portion of the gaming machine body. According to an embodiment, elements for fastening between the first coupling structure 111 and the second coupling structure 211, for instance, fastening elements, screw holes, etc., can be applied.

The first coupling structure 111 and the second coupling structure 211 can each include at least two sides which touch and support each other. In FIGS. 4 and 5, the first coupling structure 111 and the second coupling structure 211 are illustrated as touching each other on four sides, but they are not limited thereto, and various modifications, such as a cylindrical shape and other shapes, are possible.

A plurality of wireless power receiving coils 121 and a plurality of wireless power transmission coils 221 can be formed on at least two touching and supporting sides of the first coupling structure 111 and the second coupling structure 211, respectively.

In the illustrated example, four wireless power receiving coils 121 and four wireless power transmission coils 221 are exemplified, and, for instance, each wireless power receiving coil can receive power of 10 KW.

As described above, the plurality of wireless power receiving coils 121 and the plurality of wireless power transmission coils 221 can be provided in positions corresponding to each other, thereby enhancing the magnetic coupling effect.

FIG. 6 is a side sectional view illustrating the coupling structure of the topper device according to an embodiment of the present invention. FIG. 6 is an enlarged side sectional view of the first coupling structure 111 of the topper device.

In FIG. 6, at least two sides 111-1 included in the first coupling structure 111 can be made of a non-metallic material. For example, the at least two sides 111-1 where the wireless power receiving coil 121 is fixed can be made of a non-metallic material such as reinforced plastic to facilitate the magnetic coupling between the wireless power receiving coil 121 and the wireless power transmission coil.

In an embodiment, the first coupling structure 111 of the topper device can further include a magnetic shielding layer 111-2, which is provided on upper portions of the at least two sides 111-1, and to which a magnetic shielding sheet is attached. The magnetic shielding sheet can be made of at least one of metallic materials, such as Ag, Cu, Ni, Zno, SnO2, Al, carbon-based materials, such as Acetylene Black, Channel Black, PAN/Pitch, and conductive polymer materials, such as polyaniline, polypyrrole, polythiophene. Such a magnetic shielding sheet is provided to prevent the magnetic field generated during wireless power reception from affecting the topper device, thereby minimizing the impact of the magnetic field on displays, circuit components, and the likes.

FIG. 7 is a bottom view illustrating another example of the topper device according to an embodiment of the present invention. FIG. 7 illustrates an example where a plurality of wireless power receiving coils are provided on the bottom surface of the topper device.

Referring to FIG. 7, the first coupling structure 111 is provided at the bottom of the housing 110, and the plurality of receiving coils are provided on the bottom surface of the first coupling structure 111. Although not shown in FIG. 7, a plurality of transmission coils can be provided at the position of the upper portion of the gaming machine body corresponding to the bottom surface of the first coupling structure 111 of the housing 110.

Hereinafter, a control method of the topper device performed by the control module will be described with reference to FIGS. 9 to 10.

FIG. 9 is a flowchart depicting the control method performed by the control module illustrated in FIG. 3. Referring to FIG. 9, when the current of the wireless power received by the wireless power receiving module 120 is detected (S910), the control module 160 can confirm the current level of the detected current (S920).

The control module 160 can set the operation mode of the topper device according to the range of the current level (S930).

The control module 160 can control to restrictively operate at least a portion of the display elements of the topper device, for example, at least one of the display module 130 and the lamp module 140, according to the set operation mode (S940).

FIG. 10 is a flowchart depicting an example of step S930 illustrated in FIG. 9. The setting of the operation modes will be described with reference to FIG. 10.

Referring to FIG. 10, the control module 160 determines whether the confirmed current level is below a predetermined first current level (S1010) or not.

If the current level is below the first current level (S1010, Yes), the control module 160 can set the operation mode to a first mode (S1020).

In the first mode, the control module 160 can limit the brightness of the display module of the topper device within a first range, and limit the content displayed on the display module to standby content. The standby content is content that can be displayed with less power than standard content, namely, is set lower than standard content in at least one of screen transition frequency, the number of display objects, and the ratio of dark display areas below a threshold brightness.

Meanwhile, when the current level exceeds the first current level (S1010, No) but is below the second current level, which is higher than the first current level (S1020, Yes), the control module 160 can set the operation mode to a second mode (S1040).

In the second mode, the control module 160 can set so that the brightness of the display module of the topper device is not limited and the content displayed on the display module is not restricted. That is, in the second mode, power is supplied to enable stable operation of the display module without an restriction in the display of the display module, but limited control may be applied to the edge lighting of the display module or lighting of the lamp module.

In an embodiment, the topper device 100 may further include a battery for charging some of the power supplied from the wireless power receiving module. In this embodiment, the control module 160 can control to supply necessary power to the display module using the battery when no power is supplied to the wireless power receiving module from the gaming machine. Furthermore, the control module 160 can maintain the setting to the second mode when the power level of the battery is above a predetermined level.

Meanwhile, when the current level exceeds the second current level (S1020, No), the control module 160 can set the operation mode to a third mode (S1050).

In the third mode, the control module 160 does not limit not only the display of the display module but also the edge lighting or the operation of the lamp module. For instance, the brightness of the display module of the topper device is not limited, the content displayed on the display module is not restricted, and the light-emitting border provided at the edge of the display module can perform the lighting operation, or the operation of the lamp module may not be restricted.

As described above, the modes are differentially set according to the supply situations of wireless power to operate the topper device suitably even in incomplete power supply situations. Therefore, the topper device can be operated stably without the need for a storage device, such as a battery, thereby effectively reducing the manufacturing cost of the topper device since an expensive storage device is not required.

The present invention described above is not limited by the foregoing embodiments and the accompanying drawings but is defined by the claims described below. It would be easily understood by those skilled in the art that the present invention can be variously changed and modified without departing from the technical spirit of the present invention.

SEQUENCE LIST TEXT

10: gaming machine
100: topper device for gaming machine
110: button module
120: wireless power receiving module
130: display module
140: lamp module
150: communication module
160: control module
200: gaming machine body

INDUSTRIAL APPLICABILITY

The present invention can form the power transmission interface between the topper device and the gaming machine wirelessly by receiving power from the gaming machine using a wireless power module, thereby easily coupling and separating the topper device. Moreover, the present invention, which includes the wireless power coils at the portion where the topper device and the gaming machine are coupled, can form the wireless power transmission interface without any wiring work once the topper device is coupled to the gaming machine. In addition, the present invention can differentially control the control functions according to the amount of power input through the wireless power module, thereby operating the topper device suitable for power supply situations.

The invention claimed is:

1. A topper device for a gaming machine, which is coupled to an upper portion of a gaming machine body and operates in conjunction with the gaming machine, comprising:

a display module;

a housing on which the display module is fixed and which includes a first coupling structure capable of being coupled with the upper portion of the gaming machine body, wherein the upper portion of the gaming machine body includes a second coupling structure, the first coupling structure is fastened and fixed to the second coupling structure, and the first coupling structure and the second coupling structure each include at least two sides that touch and support each other, and wherein the at least two sides included in the first coupling structure are made of a non-metallic material; and a wireless power receiving module which supplies necessary power to the display module based on power provided from the gaming machine, wherein the wireless power receiving module receives power from the gaming machine body using a wireless power receiving coil unit equipped with the first coupling structure and including a plurality of wireless power receiving coils formed on each of the at least two sides included in the first coupling structure, and the wireless power receiving coil unit is configured to magnetically coupled to a wireless power transmission coil unit provided in the upper portion of the gaming machine body.

2. The topper device for a gaming machine according to claim 1, further comprising:

a communication module which receives content data to be displayed through the topper device from the gaming machine body using a short-range wireless communication method with the gaming machine body.

3. The topper device for a gaming machine according to claim 1, wherein the first coupling structure further includes a magnetic shielding layer which is provided on upper portions of the at least two sides and on which a magnetic shielding sheet is attached.

4. The topper device for a gaming machine according to claim 1, further comprising:

a control module which sets different operation modes of the topper device corresponding to a current level of power received wirelessly from the wireless power receiving module, and controls to restrictively operate at least a portion of display elements of the topper device according to the operation modes.

5. The topper device for a gaming machine according to claim 4, wherein the control module confirms the current level of the receiving current received wirelessly through the wireless power receiving coil unit, and when the confirmed current level is below a preset first current level, sets the operation mode to a first mode, and wherein in the first mode, the control module limits the brightness of the display module within a first range, and restricts the content displayed on the display module to standby content.

6. The topper device for a gaming machine according to claim 5, wherein when the confirmed current level is equal to or above the first current level but below a second current level, which is set higher than the first current level, the control module sets the operation mode to a second mode, and wherein in the second mode, the control module does not limit the brightness of the display module, and does not restrict the content displayed on the display module.

7. The topper device for a gaming machine according to claim 6, further comprising:

a battery which charges some of the power supplied from the wireless power receiving module, wherein when no power is supplied to the wireless power receiving module from the gaming machine, the battery supplies the necessary power to the display module, thereby maintaining the setting to the second mode when the power level of the battery is above a preset level.

8. A gaming machine comprising:

a gaming machine body which displays game images through a body display and controls operations of a game according to a user's input to provide the game to the user; and a topper device for a gaming machine, which is coupled to an upper portion of the gaming machine body and operates by displaying content data provided from the gaming machine body, wherein the topper device for a gaming machine receives power wirelessly from the gaming machine body in a non-contact manner using a wireless power receiving coil unit which magnetically couples with a wireless power transmission coil unit included in the gaming machine body, wherein the topper device comprises a control module which sets different operation modes of the topper device corresponding to the current level of power received wirelessly from the wireless power receiving module, and controls to restrictively operate at least a portion of display elements of the topper device according to the operation modes, wherein the control module confirms a current level of a receiving current received wirelessly through the wireless power receiving coil unit, and wherein:

when the confirmed current level is below a preset first current level, sets the operation mode to a first mode, and wherein in the first mode, the control module limits brightness of a display module within a first range, and restricts a content displayed on the display module to standby content:

when the confirmed current level is equal to or above the preset first current level but below a second current level, which is set higher than the preset first current level, the control module sets the operation mode to a second mode, and wherein in the second mode, the control module does not limit the brightness of the display module, and does not restrict the content displayed on the display module; and when the confirmed current level exceeds the second current level, the control module sets the operation mode to a third mode, and wherein in the third mode, the control module does not limit the brightness of the display module, does not restrict the content displayed on the display module, and a light-emitting border provided at an edge of the display module performs a lighting operation.

9. The gaming machine according to claim 8, wherein the topper device comprises:

a display module;

a housing on which a display module is fixed and which includes a first coupling structure capable of being coupled with the upper portion of the gaming machine body; and a wireless power receiving module which receives power from the gaming machine body in the non-contact manner using the wireless power receiving coil unit included in the first coupling structure, and supplies necessary power to the display module.

10. The gaming machine according to claim 9, wherein the upper portion of the gaming machine body includes a second coupling structure, wherein the first coupling structure is fastened and fixed to the second coupling structure, and wherein the first coupling structure and the second coupling structure each include at least two sides that touch and support each other.

* * * * *